United States Patent
Shimizu

(10) Patent No.: US 7,064,780 B2
(45) Date of Patent: Jun. 20, 2006

(54) IMAGE RECORDING APPARATUS WITH SELECTION OF STILL IMAGE TO BE RECORDED FROM MULTI-PICTURE DISPLAY

(75) Inventor: Tetsuya Shimizu, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 760 days.

(21) Appl. No.: 09/860,164

(22) Filed: May 17, 2001

(65) Prior Publication Data

US 2002/0003943 A1   Jan. 10, 2002

(30) Foreign Application Priority Data

May 23, 2000   (JP)   ............................. 2000-151837

(51) Int. Cl.
H04N 5/225   (2006.01)

(52) U.S. Cl. ............................... 348/220.1; 348/231.2; 348/333.05

(58) Field of Classification Search ............. 348/220.1, 348/333.05, 231.2, 208.1; 386/112; 382/107
See application file for complete search history.

(56) References Cited

U.S. PATENT DOCUMENTS

| | | | | |
|---|---|---|---|---|
| 4,827,347 | A | * | 5/1989 | Bell ....................... 348/333.05 |
| 4,858,032 | A | * | 8/1989 | Okada et al. ................ 386/112 |
| 5,459,582 | A | * | 10/1995 | Takahashi ................... 386/112 |
| 5,706,097 | A | * | 1/1998 | Schelling et al. ............ 358/296 |
| 6,023,520 | A | * | 2/2000 | Nagasaka et al. ........... 382/107 |
| 6,295,086 | B1 | * | 9/2001 | Fukushima et al. ....... 348/231.1 |
| 6,515,704 | B1 | * | 2/2003 | Sato ...................... 348/333.05 |
| 6,584,463 | B1 | * | 6/2003 | Morita et al. ................. 386/83 |
| 6,603,866 | B1 | * | 8/2003 | Motono et al. .......... 348/208.1 |

* cited by examiner

Primary Examiner—Tuan Ho
Assistant Examiner—Gevell Selby
(74) Attorney, Agent, or Firm—Cowan, Liebowitz & Latman, P.C.

(57) ABSTRACT

A recording apparatus is constructed so that image data of a plurality of frames extracted at predetermined timings from moving image data supplied from an image pickup unit is reduced in size to generate a multi-picture from size-reduced images. The apparatus is provided with a moving image recording mode and a still image recording mode. In the moving image recording mode, moving image data is recorded on a recording medium. In the still image recording mode, image data of still images selected from a plurality of still images constituting a multi-picture is recorded on the recording medium.

10 Claims, 2 Drawing Sheets

IMAGE RECORDING APPARATUS WITH SELECTION OF STILL IMAGE TO BE RECORDED FROM MULTI-PICTURE DISPLAY

BACKGROUND OF THE INVENTION

1. Field of the Invention

The present invention relates to an image recording apparatus, and more particularly to a process of recording still images.

2. Related Background Art

Apparatus for recording and reproducing high quality image information as digital signals are practically used nowadays because of high density of recording media and improvement on image processing techniques.

For example, a camera integrated VTR is available in commerce, which is in conformity with the home digital VCR standards (hereinafter called SD standards) stipulated by the HD digital VCR council. Many products in conformity with the SD standards have a still image recording mode in addition to a moving image recording mode.

Some VTR has also a continuous still image pickup function as an application of still image recording. With this continuous still image pickup function, a so-called multi-picture having a plurality of still images reduced in size and synthesized into one frame can be formed and recorded in a magnetic tape.

However, in recording a multi-picture having a plurality of still images, each still image is reduced in size and the image having the small number of pixels is recorded. Therefore, each still image has a resolution insufficient for a person viewing it.

SUMMARY OF THE INVENTION

It is an object of the invention to solve the above-described problem.

It is another object of the invention to make it possible to easily and efficiently record and reproduce a plurality of still images.

It is a further object of the invention to make it possible to easily recognize a target still image or images among a plurality of still images and reproduce a high precision still image or images.

To attain the above-described objects, according to an aspect of the present invention, there is provided a recording apparatus comprising image pickup means;

recording means;

extracting means for extracting image data of a plurality of frames at predetermined timings from moving image data output from said image pickup means;

memory means for storing the image data of a plurality of frames extracted by said extracting means;

multi-picture generating means for reducing in size the image data of a plurality of frames extracted by said extracting means, and generating multi-picture data for displaying the image data of a plurality of frames reduced in size in a same frame;

selecting means for selecting a desired one or ones of a plurality of images reduced in size and contained in the multi-picture; and mode setting means for setting a recording mode among a plurality of recording modes including a moving image recording mode wherein said recording means records the moving image data supplied from said image pickup means on a recording medium and a still image recording mode wherein said recording means records image data representative of an image selected by said selecting means on the recording medium as a still image.

Other objects and features of the present invention will become apparent from the following detailed description of an embodiment when read in conjunction with the accompanying drawings.

DETAILED DESCRIPTION OF THE PREFERRED EMBODIMENTS

An embodiment of the invention will be described with reference to the accompanying drawings.

Figure 1:
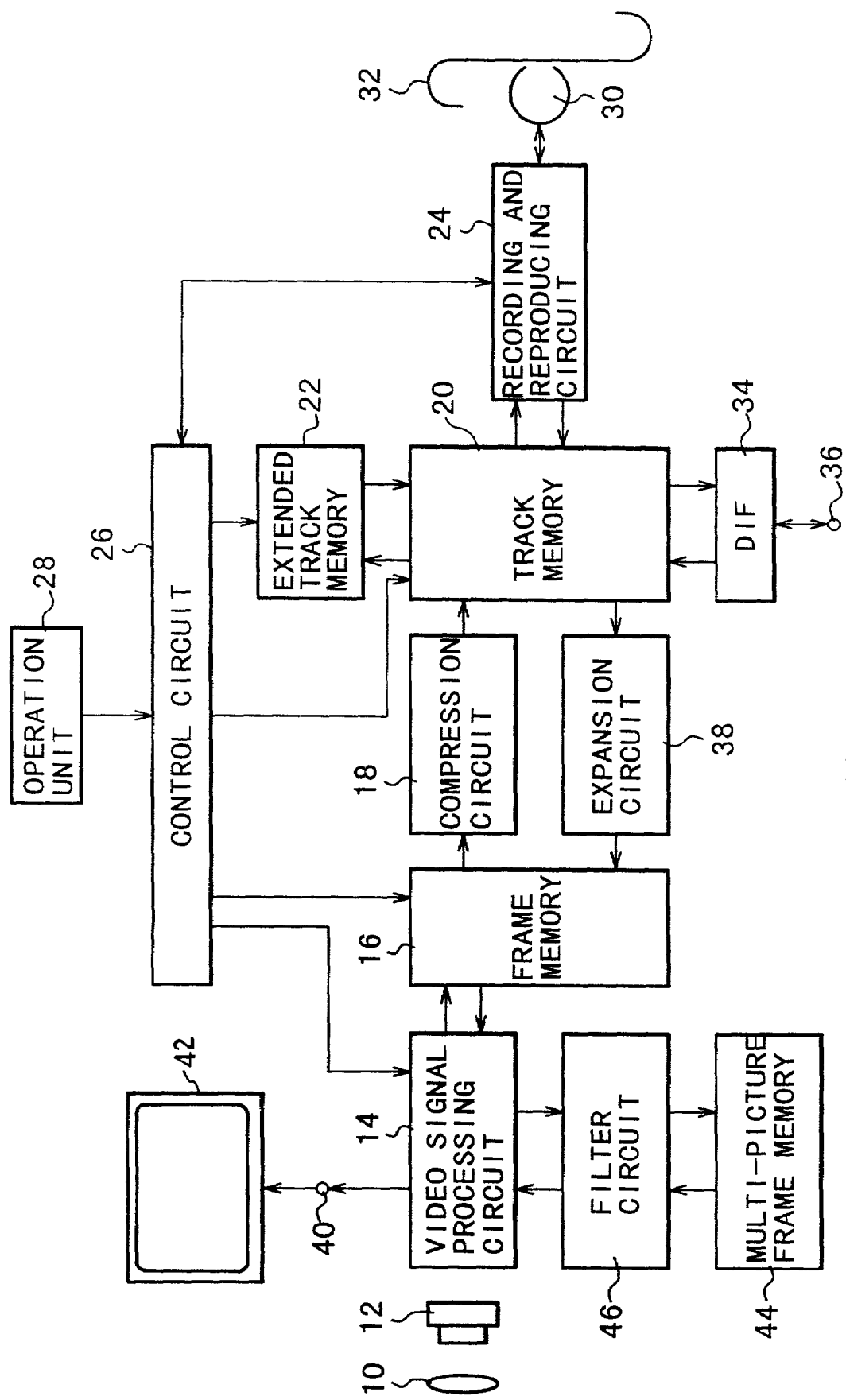
FIG. 1 is a block diagram showing the outline structure of a camera integrated VTR to which the present invention is applied.

FIG. 1 is a block diagram showing the outline structure of a camera integrated VTR in conformity with the SD standards according to an embodiment of the invention.

Referring to FIG. 1, reference numeral 10 represents a photographing lens, reference numeral 12 represents an image pickup element, and reference numeral 14 represents a video signal processing circuit. A frame memory 16 stores image data supplied from the video signal processing circuit 14 in a state being not compressed. A compression circuit 18 compresses the amount of image data through encoding. A track memory 20 temporarily stores compressed image data. An extended track memory 22 is an extended memory to be used for capturing a still image. A recording and reproducing circuit 24 performs an error correction process in conformity with a record format of the SD standards, a process using ID, sync data, and various data, a modulation process, a demodulation process and the like. A control circuit 26 controls each circuit portion such as the video signal processing circuit 14, track memory 20 and extended track memory 22, in accordance with an instruction supplied from an operation unit 28. The operation unit 28 has various operation keys for selecting and setting a still image or images in a multi-picture and for generating various instructions such as recording and reproducing. Reference numeral 30 represents a magnetic head, and reference numeral 32 represents a magnetic tape. A digital interface (DIF) 34 is used for transferring image data and other data as compressed and encoded data in conformity with the SD standards, to and from an external apparatus. A digital input/output terminal 36 is used for inputting and outputting digital data relative to an external apparatus. DIF 34 processes data in accordance with the format in conformity with the IEEE1394 serial bus interface standards.

An expansion circuit 38 expands the amount of image data through decoding. Reference numeral 40 represents a video output terminal, reference numeral 42 represents a video monitor, and reference numeral 44 represents a multi-picture frame memory. A filter circuit 46 reduces the size of image data output from the video signal processing circuit 14 and writes the image data reduced in size into the memory 44 to generate a multi-picture.

First, an operation of normal moving image recording will be described.

The image pickup element 12 converts an optical image supplied via the photographing lens 10 into electric signals. The video signal processing circuit 14 converts the image signal supplied from the image pickup element 12 into digital signals. The digital image signal is separated into luminance and color difference signals by using a matrix circuit corresponding to the layout of color filters of the image pickup element 12. The digital image signal is also sampled in accordance with the SD standards and written in the frame memory 16. The frame memory 16 can store image data of two frames not compressed.

The video signal processing circuit 14 also outputs the image data supplied from the image pickup element 12 via the terminal 40 to the monitor 42 to display moving images corresponding to the image data on the monitor 42.

The compression circuit 18 reads the image data written in the frame memory 16 in the order in conformity with the SD standards for the image data shuffling, and performs known DCT, quantization, Huffman encoding and the like to thereby reduce the data amount. The shuffled image data is deshuffled by writing it in the track memory 20 at predetermined addresses. At this time, the data written in the track memory 20 has a data amount about one fifth of that of the image data before being compressed stored in the frame memory 16. The track memory 20 can store compressed image data of three frames.

The data written in the track memory 20 is read in the recording order of the tape 32 and sent to the recording and reproducing circuit 24. The recording and reproducing circuit 24 adds sync data, ID data and the like in addition to supplementary data to the data read from the memory 20. The recording and reproducing circuit 24 then performs error correction coding, modulation and the like in accordance with the record format to record the data in the magnetic tape 32 with the magnetic head 30.

Next, an operation of normal moving image data reproducing will be described.

Data reproduced from the tape 32 with the magnetic head 30 is sent to the recording and reproducing circuit 24. The recording and reproducing circuit 24 demodulates the reproduced data to recover the original digital data, which is then written in the track memory 20 at addresses determined from the ID data contained in the reproduced data.

The expansion circuit 38 reads the image data stored in the track memory 20 at predetermined timings, and performs the reverse processing of recording to decode the image data, expand the data amount and write the expanded data in the frame memory 16. The video signal processing circuit 14 reads the image data stored in the frame memory 16 at predetermined timings, and outputs the read image data to the monitor 42 via the terminal 40 to display images corresponding to the reproduced image data.

The image data written in the track memory 20 can be output via DIF 34 during both recording and reproducing. DIF 34 outputs encoded image data and other data stored in the track memory 20 to an external apparatus via the terminal 36.

Next, an operation of normal still image recording will be described.

In response to a still image recording instruction from the operation unit 28 while images corresponding to moving image data supplied from the image pickup element 12 are displayed on the monitor 42, the control circuit 26 instructs the video signal processing circuit 14 to capture a still image. Upon reception of the still image capture instruction, the video signal processing circuit 14 extracts image data of one frame corresponding to the capture instruction from the moving image signals supplied from the image pickup element 12, and outputs the extracted image data to the frame memory 16.

The compression circuit 18 compresses and encodes the image data of one frame and writes it in the track memory 20. In the still image recording mode, the control circuit 26 repetitively reads the image data of one frame stored in the track memory 20 for a predetermined period, in this embodiment, about 6.5 seconds, and outputs the image data to the recording and reproducing circuit 24. The recording and reproducing circuit 24 processes the image data output from the track memory 20 in the manner described earlier, adds identification information (photo picture ID) for 5 seconds to be used for searching still image data, and records the still image data on the tape 32 with the head 30 for about 6.5 seconds.

The process of reproducing still image data recorded in the normal still image recording mode is similar to the process of reproducing moving image data described earlier.

Next, an operation of a sequential still image pickup mode for capturing still image data will be described.

VTR of this embodiment has the still image recording mode for picking up a still image of one frame as well as the continuous still image pickup mode of continuously picking up still images of a plurality of frames at a predetermined time interval and recording them.

In this embodiment, the continuous still image pickup mode has three stages, picking up still image data of a plurality of still images, selecting a desired still image or images, and recording a selected still image or images.

Figure 2:
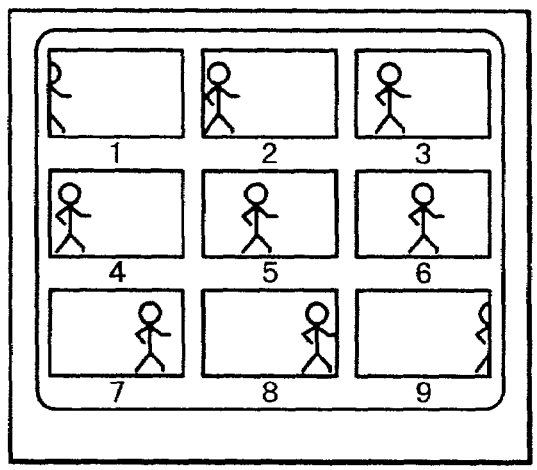
FIG. 2 shows an example of a multi-picture.

The description will be given for an operation of displaying a multi-picture constituted of continuously picked-up still images, for example, nine still images such as shown in FIG. 2, and recording only those images selected from the multi-picture in the tape. For the purposes of simplicity of the description, it is assumed that the capacity of the multi-picture frame memory 44 allows image data of one frame not compressed to be stored, and that the capacity of the extended track memory 22 allows image data of nine frames compressed by about one fifth to be stored.

First, when the operation unit 28 sets the continuous still image pickup mode and instructs still image recording, the control circuit 26 controls the video signal processing circuit 14 to automatically extract image data of one frame at a predetermined interval from moving image data supplied from the image pickup element 12 and supply the extracted image data to both the filter circuit 46 and frame memory 16. The image data of one frame written in the frame memory 16 is supplied to the compression circuit 18 whereat it is subjected to the compression and encoding process similar to the normal still image recording and written in the extended track memory 22 at a predetermined address for each frame.

In order to realize a multi-picture display, the filter circuit 46 thins out pixels of the image data of one frame both in the horizontal and vertical directions to perform a filtering process and reduce the size of the still image (in this example, the size is reduced by one third both in the horizontal and vertical directions), and writes the image data reduced in size in the multi-picture frame memory 44 at an address representative of a display location.

The above processes are repeated by the video signal processing circuit 14 for the still image data of nine frames continuously extracted, to thereafter complete the capture of still images for the multi-picture display.

Until this time, image data constituting the multi-picture such as shown in FIG. 2 has been written in the multi-picture frame memory 44, and image data of continuously picked-up images is written in the extended track memory 22 as compression-encoded data.

After the filter circuit 46 writes still image data of continuously picked-up nine frames in the memory 44 and generates image data for the multi-picture, it reads this image data from the memory 44 and outputs it to the video signal processing circuit 14. The video signal processing circuit 14 outputs the image data for the multi-picture to the monitor 42 via the video output terminal 40 so that still images of the multi-picture such as shown in FIG. 2 are displayed on the screen of the monitor 42. With the above operations, the capture of still images is completed.

After the capture of still image data of nine frames is completed, the control circuit 26 controls the video signal processing circuit 14 to display the still images of nine frames together with a notice and an image serial number on the monitor 42 to urge a user to select a still image or images desired to be recorded among the still images of nine frames.

The user selects by using the operation unit 28 one or a plurality of still images to be recorded in the tape 32, from the nine still images displayed on the screen of the monitor 42.

Figure 3:
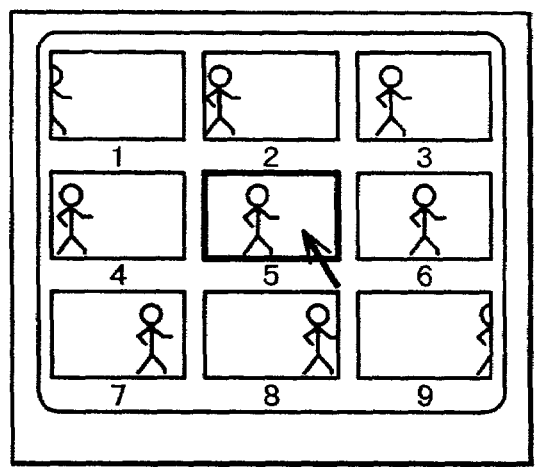
FIG. 3 is a diagram illustrating a process of selecting a still image in a multi-picture.

Various methods can be utilized in order to select an image. For example, as shown in FIG. 3, a desired one or ones of still images reduced in size and displayed on the monitor screen can be designated by using a mouse or button. The control circuit 26 controls the video signal processing circuit 14 in accordance with an operation by the operation unit 28 to display an arrow or the like on the monitor screen at a position corresponding to the motion of the mouse or button or an emphasized display frame of a corresponding size-reduced still image or images. In this case, the control circuit 26 calculates the address of the compressed and encoded image data corresponding to the size-reduced still image designated on the monitor 42 among the still image data of the nine frames stored in the extended track memory 22.

When the still image to be recorded is selected, the control circuit 26 supplies the address of the selected still image data to the extended track memory 22 to read the compressed image data of one frame corresponding to the selected still image. The read image data is output via the track memory 20 to the expansion circuit 38 whereat the image data is expanded and written in the frame memory 16. The video signal processing circuit 14 repetitively reads still image data of one frame written in the frame memory 16 and outputs the still image data with an unreduced size to the monitor 42 via the terminal 40.

Figure 4:
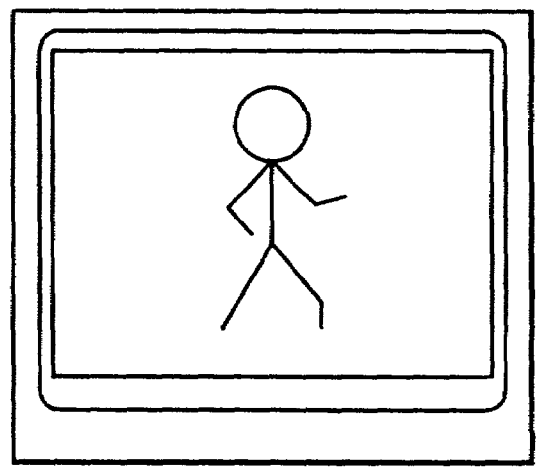
FIG. 4 is a diagram showing an example of a full size display of a selected still image.

In the above manner, the selected image is displayed on the screen of the video monitor 42 in a full size as shown in FIG. 4. A user can confirm the details of the selected image on the monitor screen. The control circuit 26 controls the video signal processing circuit 14 to display the still image of the full size shown in FIG. 4 for a predetermined period (several seconds to several tens seconds) and thereafter return to the multi-picture display shown in FIG. 3. In the multi-picture display shown in FIG. 3, if still images of a plurality of frames are selected at the same time, those selected still images are continuously displayed in a full size each for a predetermined period.

A still image to be recorded is selected by performing the above-described operation on a desired reduced image in the multi-picture display. With the above operation, an image selection operation is completed. It is assumed herein that all of nine reduced images are selected.

After the still images to be recorded are selected and when a record key of the operation unit 28 is operated to instruct recording, the control circuit 26 controls the extended track memory 22 to read still image data of each selected frame compressed and encoded and output it to the recording and reproducing circuit 24.

Similar to the normal still image recording, the image data of the same frame is repetitively read out for 6.5 seconds. The recording and reproducing circuit 24 executes an error correction coding and modulation of the image data read out from the extended track memory 22 in accordance with the record format, and writes the image data in the magnetic tape 32 with the magnetic head 30.

In the continuous still image pickup mode, the recording and reproducing circuit 24 generates multi-picture supplementary information to be written in a sub-code field to be recorded together with the image data, in addition to the above-described PPID (photo picture ID), to thereby record the image data. The multi-picture supplementary information includes information indicating that the image data was picked up in the continuous still image pickup mode, information on a reduction factor and display position of an image to be used when the multi-picture is reproduced, information on the number of frames of the multi-picture (continuously picked-up still images), information on the serial number of each of the continuously picked-up still images, and the like. This recording operation is performed for all of the selected still images.

In the still image recording mode, if the digital input/output terminal 36 is connected to an external apparatus, data read from the extended track memory 22 is supplied via DIF 34 and digital input/output terminal 36 to the external apparatus (such as a printer and a personal computer). In this manner, the selected image can be output and printed out or supplied to the computer.

Next, an operation of reproducing a still image added with the multi-picture supplementary information and recorded in the magnetic tape 32 will be described.

The magnetic head 30 outputs the data reproduced from the magnetic tape 32 to the recording and reproducing circuit 24. The recording and reproducing circuit 24 performs the demodulation and error correction process on the data supplied from the magnetic head 30 and writes the data in the track memory 20. The expansion circuit 38 performs the expansion process on the reproduced data read out from the track memory 20 and writes the data in the frame memory 16. The video signal processing circuit 14 reads out the image data from the frame memory 16, converts it into video signals, and outputs them from the video output terminal 40.

The still image data recorded in the continuous still image pickup mode is recorded together with the multi-picture supplementary information. The recording and reproducing circuit 24 detects the multi-picture supplementary information from the reproduced data, and outputs the supplementary information to the control circuit 26. The recording and reproducing circuit 24 writes the still image data of one frame to be reproduced for 6.5 seconds in the track memory 22. The image data written in the track memory 22 is read out and expanded by the expansion circuit 38, and then written in the frame memory 16.

Upon reception of the multi-picture supplementary information from the recording and reproducing circuit 24, the control circuit 26 controls the video signal processing circuit 14 in accordance with the supplementary information, and transfers the image data read out from the frame memory 16 to the filer circuit 46, similar to the recording operation. More specifically, the control circuit 26 supplies the video signal processing circuit 14 with the information such as the reduction factor, the display position, and the number of continuously picked-up still images, in accordance with the multi-picture supplementary information.

In accordance with the information supplied from the control circuit 26, the video signal processing circuit 14 controls the filter circuit 46 to reduce the size of the image signal read out from the frame memory 16 and write the image signal in the multi-picture frame memory 44 at the address corresponding to the display position. The situation at this time is the same as that when the process of capturing still images recorded in the multi-picture recording process is completed.

As described earlier, the multi-picture supplementary information includes the information on the serial number of each of continuously picked-up still images. In accordance with this information, the control circuit 26 temporarily stops the reproduction process for the magnetic tape 32 when all images constituting the multi-picture are reproduced from the magnetic tape 32.

The control circuit 26 controls the video signal processing circuit 14 to read out the image data representative of the multi-picture stored in the memory 44 via the filter circuit 46 and display the images on the monitor 42 via the terminal 40. The images displayed on the monitor 42 are as shown in FIG. 3.

In this state, the user operates the operation unit 28 to select a desired image among the nine size-reduced images shown in FIG. 3. In response to this, the control circuit 26 reads out the still image data corresponding to the selected size-reduced still image from the extended track memory 22, the still image data then being expanded by the expansion circuit 38 and written in the frame memory 16. The still image data of one frame is repetitively read out from the frame memory 16 for a predetermined period to display the still image of a full size on the monitor 42 via the video signal processing circuit 14.

The user confirms the still image of the full size. Thereafter, for example, if this still image is to be output to an external apparatus, this effect is notified so that the control circuit 26 reads out the selected still image data from the extended track memory 22, and outputs it via DIF 34 to the external apparatus.

After the still image of the full size is displayed for the predetermined period, the video signal processing circuit 14 again displays the multi-picture on the monitor 42. In response to another instruction from the operation unit 28, e.g., a normal reproduction operation instruction, the control circuit 26 controls each circuit portion to perform a normal moving image or still image reproduction operation.

If a reproducing apparatus cannot detect the multi-picture supplementary information, a still image is reproduced for a predetermined period, similar to the case wherein a still image recorded in the normal still image recording mode is reproduced.

As easily understood from the foregoing description, according to the embodiment, image data of a full size corresponding to a size-reduced still image of the multi-picture is stored as a compressed and encoded data. Accordingly, still image data corresponding to continuously picked-up still images can be recorded, reproduced and output by a simple operation without considerably increasing the memory capacity and without degrading the image quality.

Information indicating that image data was recorded in the continuous still image pickup mode and supplementary information necessary for forming a multi-picture are recorded together with the image data. These information can be used during the reproduction so that a handy method of editing and outputting a plurality of still images can be obtained.

The above-described functions can be easily realized by utilizing the same compression process as that for moving images also in the continuous image pickup mode and by expanding the capacity of the memory mapped in accordance with the track format used in processing moving images after the compression.

All processes can be executed at a process rate for moving images so that a series of processes can be executed at high speed.

In this embodiment, the extended track memory for the continuous still image pickup mode is provided discretely. The extended track memory is not always required to be formed separately from the track memory. For example, the capacity of the track memory may be increased by an amount necessary for the continuous still image pickup mode.

All the multi-picture frame memory 44, frame memory 16 and track memory 20 may be integrated into one memory chip. The frame memory 16 and track memory 20 may be formed in one memory circuit.

Many widely different embodiments of the present invention may be constructed without departing from the spirit and scope of the present invention. It should be understood that the present invention is not limited to the specific embodiments described in the specification, except as defined in the appended claims.

What is claimed is:

1. A recording apparatus comprising:
   image pickup means;
   recording means;
   still image generating means for generating image data of a plurality of frames as still image using moving image data obtained by said image pickup means;
   memory means for storing the image data of a plurality of frames generated by said still image generating means;
   multi-picture generating means for generating multi-picture data of the image data of the plurality of frames generated by said still image generating means, by reducing in size the image data thereof, and displaying the multi-picture represented by the generated multi-picture data on a screen;
   selecting means for selecting a desired one or ones of a plurality of images included in the multi-picture displayed on the screen; and
   mode setting means for setting a recording mode among a plurality of recording modes including a moving image recording mode wherein said recording means records the moving image data obtained by said image pickup means on a recording medium and a still image recording mode wherein said recording means records image data representative of an image, among the plurality of images in the multi-picture displayed on the screen, selected by said selecting means on the recording medium as a still image and is inhibited to record the image data of the images, among the plurality of images in the multi-picture displayed on the screen, other than the image selected by said selecting means.

2. An apparatus according to claim 1, further comprising compressing means for encoding the moving image data supplied from said image pickup means and the image data of a plurality of frames generated by said still image generating means to reduce a data amount, wherein said memory means stores the image data of a plurality of frames compressed by said compressing means.

3. An apparatus according to claim 1, wherein in the still image recording mode, said recording means records supplementary information as to a display state of each image selected in the multi-picture.

4. An apparatus according to claim 3, wherein the supplementary information includes information as to a size reduction factor of the selected image.

5. An apparatus according to claim 3, wherein the supplementary information includes information as to a display position of the selected image in the multi-picture.

6. An apparatus according to claim 3, wherein the supplementary information includes information as to an order of selection of the extracted image in the multi-picture.

7. An apparatus according to claim 3, further comprising reproducing means for reproducing the image data and supplementary information from the recording medium, wherein said multi-picture generating means reduces in size the image data recorded in the still image recording mode among image data reproduced by said reproducing means, in accordance with the supplementary information reproduced by said reproducing means, to generate image data representative of the multi-picture.

8. An apparatus according to claim 1, wherein said still image generating means generates the image data of a predetermined number of frames in response to a still image photographing instruction, and said multi-picture generating means generates the multi-picture data of the image data of the predetermined number of frames.

9. An apparatus according to claim 8, wherein said still image generating means extracts image data of a predetermined number of frames from the moving image data at a predetermined interval and generates image data of a plurality of frames as still image using the enacted image data.

10. An apparatus according to claim 1, further comprising display controlling means for displaying the multi-picture represented by the multi-picture data generated by said multi-picture generating means on a display device, wherein said display controlling means reads out the image data of the image selected by said selecting means in response to a selection operation of the selecting means, and displays the selected image represented by said image data read out from said memory means in place of the multi-picture.

* * * * *